United States Patent [19]

Laslo et al.

[11] 4,198,388

[45] Apr. 15, 1980

[54] SELECTIVE REMOVAL OF $H_2S$ FROM AN $H_2S$ AND $CO_2$ CONTAINING GAS STREAM

[75] Inventors: Joseph A. Laslo, Bethlehem; Daniel Kwasnoski, Hellertown, both of Pa.

[73] Assignee: Bethlehem Steel Corporation, Bethlehem, Pa.

[21] Appl. No.: 877,639

[22] Filed: Feb. 14, 1978

[51] Int. Cl.$^2$ .................. C01B 17/04; B01D 53/34
[52] U.S. Cl. .................. 423/574 R; 423/210; 423/228; 55/224; 55/226; 261/23 R; 261/55; 261/63; 422/170; 422/189
[58] Field of Search ............ 423/210, 220, 659, 573.6, 423/222, 223, 573 R, 574 R, 224, 226, 574 L, 228, 227, 229, 232–234; 55/30, 31, 63, 68, 73, 180, 226–228; 261/146–148, 45, 46, 54, 55, 63, 21–23 R; 23/261, 283, 284, 288 E; 422/169, 170, 188, 189, 900

[56] References Cited

U.S. PATENT DOCUMENTS

| 420,751 | 2/1890 | Walker | 261/23 R |
|---|---|---|---|
| 903,832 | 11/1908 | Black et al. | 261/63 |
| 929,358 | 7/1909 | Wilton | 261/23 R |
| 1,848,156 | 3/1932 | Bonnemann | 423/234 |
| 1,892,428 | 12/1932 | Fonda | 55/19 |
| 1,925,198 | 9/1933 | Melville | 423/222 |
| 1,962,525 | 6/1934 | Richardson | 423/210 |
| 2,652,129 | 9/1953 | Benedict | 55/48 |
| 2,868,524 | 1/1959 | Annable et al. | 23/283 X |
| 3,266,866 | 8/1966 | Bally et al. | 423/226 |
| 3,333,398 | 8/1967 | Schneider | 55/224 |
| 3,823,222 | 7/1974 | Benson | 423/226 |
| 3,859,414 | 1/1975 | Urban | 423/222 |
| 3,890,120 | 6/1975 | Guyot et al. | 55/62 |
| 3,934,012 | 1/1976 | Schievelbein | 423/232 |
| 3,965,244 | 6/1976 | Sykes, Jr. | 423/228 |
| 3,989,811 | 11/1976 | Hill | 423/573.6 |
| 4,024,208 | 5/1977 | Wetteborn | 423/210 X |
| 4,047,904 | 9/1977 | Worrall | 55/18 |
| 4,059,421 | 11/1977 | Kurata et al. | 55/196 |
| 4,085,192 | 4/1978 | Van Scoy | 423/226 |
| 4,085,199 | 4/1978 | Singleton et al. | 423/574 R |

FOREIGN PATENT DOCUMENTS

| 947045 | 5/1974 | Canada | 423/228 |
|---|---|---|---|
| 781513 | 8/1957 | United Kingdom | 261/21 |

*Primary Examiner*—Earl C. Thomas
*Attorney, Agent, or Firm*—Joseph J. O'Keefe; Charles A. Wilkinson; Michael Leach

[57] ABSTRACT

A method and apparatus for selectively removing $H_2S$ from an $H_2S$ and $CO_2$ containing gas stream which has a variable flow rate. The absorption apparatus is divided into two connected individual absorption volumes in which the gas and absorbent solution can countercurrently contact each other and has means to control the passage of the fluid streams through the individual absorption volumes.

12 Claims, 13 Drawing Figures

SELECTIVE REMOVAL OF H₂S FROM AN H₂S AND CO₂ CONTAINING GAS STREAM

CROSS-REFERENCES TO RELATED APPLICATIONS

Related applications are titled "Selective Removal of a Gaseous Component from a Multi-Component Gas Stream" Ser. No. 877,634 filed by J. A. Laslo, M. O. Tarhan, C. W. Sheldrake, and D. Kwasnoski and "Maintaining the Selective Removal of H₂S from a Variably Flowing Gas Stream Containing H₂S and CO₂" Ser. No. 877,636 filed by J. A. Laslo and J. K. Laberteaux.

FIELD OF INVENTION

This invention relates to improving the selectivity of absorption processes. More particularly this invention relates to a method and apparatus for improving the selective removal of a desired gaseous component from a gas stream having a variable flow rate.

BACKGROUND OF THE INVENTION

Absorption systems have been designed to selectively remove a gaseous component from a gas stream by absorption into an absorbent solution. In many, if not most of these systems, the absorbent solution also absorbs other gaseous components contained in the gas stream but at a different rate from that of the desired gaseous component. The rates of absorption of the various gaseous components into the absorbent solution are a function of time. Consequently the relative concentrations of the gaseous components in the absorbent solution will depend on the length of time the gases contact the liquid absorbent, i.e. the residence time of the gas in an absorption zone (volume) where intimate gas-liquid contact occurs. Since these absorption systems are designed to achieve particular relative concentrations of absorbed gaseous components from a gas stream flowing at a particular rate, such absorption systems are thrown into disruption whenever the gas flow rate changes. This difficulty will be discussed hereinafter particularly as it pertains to the selective removal of H₂S from a gas stream.

The removal of H₂S from a gas stream is a problem that has long confronted workers in many diverse industries. For example, the manufactured gas industry and the coke-making industry, which commonly produce coal gas containing unacceptable amounts of H₂S by the destructive distillation of coal, have a need to remove the H₂S. Other examples are the natural gas industry where the H₂S content of many gas streams is often too high for commercial acceptance and the petroleum industry where the crude oil to be refined into various products contains a minor amount of sulfur in the form of various sulfur compounds.

The removal of H₂S has been accomplished in the prior art in numerous ways which usually involve one of the following techniques: (1) selective absorption of H₂S into a wide variety of liquid absorbent solutions which can then be regenerated to afford a concentrated H₂S gas stream for further processing in a sulfur recovery system; (2) adsorption on a solid adsorbent with eventual conversion of the adsorbed H₂S into a readily removable sulfur-containing product; and (3) selective reaction of H₂S with a suitable chemical reagent which produces an easily separable sulfur containing product.

Of the techniques in the first category, probably the most efficient H₂S removal process utilizes alkanolamines in aqueous absorbent solutions. However, the removal of H₂S becomes complicated by the fact that the gas stream frequently contains $CO_2$ which is a slightly stronger acid. $H_2S$ tends to be preferentially absorbed into the basic alkanolamine absorbent solutions, but when equilibrium is established through extended contact time between the absorbent solution and the gas stream, the relative amount of absorbed $CO_2$ increases.

For example, coke oven gas, which contains $H_2S$ and $CO_2$ in addition to other gaseous components, may be treated with an aqueous monoethanolamine (MEA) solution to remove substantially all of the $H_2S$ present utilizing any suitable absorption apparatus such as a packed tower absorber, a spray contact apparatus, a bubble tray absorber and the like. The $H_2S$ will react almost instantaneously upon contact with the aqueous MEA solution to form monoethanolamine sulfide or hydrosulfide which may then be decomposed by the application of heat to the solution prior to or simultaneous with the stripping of the $H_2S$ from the solution, for example by the use of steam in the desorption stage.

Carbon dioxide, on the other hand, takes a significant, finite time to react with the water in the MEA solution to form carbonic acid according to the well-known equilibrium reaction prior to reacting with the MEA to form a monoethanolamine carbonate or bicarbonate. Thus the $CO_2$ does not tend to be taken up by the MEA solution as readily, and is consequently not removed from the gas stream as quickly as the $H_2S$. In general, it may be simplistically stated that the molar ratio of $H_2S$ to $CO_2$ absorbed in the absorbent solution will depend principally upon the gas-liquid contact volume and the residence time of the gas in this absorption volume. By controlling the throughput, or flow rate, of the gas to the absorber so that only a portion of the $CO_2$ has time to be absorbed, the relative amount of $CO_2$ and $H_2S$ taken up by the absorbent solution can be controlled so that almost all of the $H_2S$ content of the gas is absorbed while less than the total available $CO_2$ is absorbed into the MEA. Since $H_2S$ is absorbed at a much greater rate into an alkaline absorbent than does $CO_2$ and if the absorption step is conducted under non-equilibrium conditions in a manner such that the gas stream is only in contact with the absorbent solution for a relatively short period of time (i.e. relative to the time for an equilibrium condition to be established), some selectivity for $H_2S$ can be obtained if larger amounts of $H_2S$ can be tolerated in the treated gas stream than would otherwise be present with a longer contact time. So long as the throughput of the gas to the absorber is relatively constant and is significantly faster than the time required to absorb all of the $CO_2$ into the solution, the ratio of $H_2S$ and $CO_2$ absorbed will tend to remain substantially constant. The unabsorbed $CO_2$ leaves the absorption apparatus along with any other unabsorbed gases which may be present in the exhausted "sweet", or desulfurized coke oven gas.

Hydrogen sulfide removal and sulfur recovery systems for removing $H_2S$ from coke oven gas (COG) are designed with the above factors in mind. The absorption capacity, or volume, in which the gas stream and absorbent solution are intimately contacted must be dimensioned to accommodate and desulfurize the maximum COG flow that can be expected from the coke oven batteries. Any lesser capacity would result in significant concentrations of $H_2S$ in the desulfurized sweetened COG and eventual pollution of the environment. In conjunction with the absorption capacity, the flow rate of the lean absorbent solution is preferentially selected to absorb $H_2S:CO_2$ in a molar ratio of greater than 1:3 and to produce a fully loaded or rich absorbent solution to maximize the efficiency of the desorption stage.

The loaded absorbent from the absorption apparatus is passed to a desorption apparatus to thermally drive the absorbed gases out of the absorbent solution to yield regenerated or lean absorbent for recycling to the absorption zone and an $H_2S$ and $CO_2$ containing desorbed acid gas stream which is usually directed to a sulfur recovery plant. In many cases sulfur recovery is accomplished in a Claus plant where $SO_2$ is mixed with the desorbed gas stream. The necessary $SO_2$ can be produced by burning an appropriate amount of the $H_2S$ or, alternatively, a portion of the final sulfur product from the Claus plant. The $SO_2$ reacts with the $H_2S$ to produce elemental sulfur according to the well-known equation $$2H_2S + SO_2 \rightarrow 3S + 2H_2O.$$

The above described $H_2S$ removal and sulfur recovery system and similar systems for the selective removal of $H_2S$ from gases that contain $H_2S$ and $CO_2$, and possibly one or more other components, are well-known. The selectivity of such systems is based on differences in absorption velocity of $H_2S$ and $CO_2$ and is ensured by reducing to a sufficient extent the contact time between the gas and the absorbent solution. The flexibility of such processes is very limited, however. When the feed gas flow rate or throughput decreases in a given absorption system, the contact or residence time immediately increases with a consequent lowering of the selectivity because the absorption process moves in the direction of equilibrium conditions for the absorption of $CO_2$ and results in a decreasing $H_2S:CO_2$ absorption ratio. Upon desorption, the increased $CO_2$ content of the desorbed gas stream may reach such a concentration that it dilutes the $H_2S-SO_2$ combustion mixture to a degree such that the Claus plant becomes inoperative.

In a coking operation, for example, the COG flow from the coke ovens will often vary below the maximum COG flow for which the absorption system was designed. As coke oven batteries are shut down or coking rates are reduced, the COG flow to the absorber may quickly be reduced to such a level as to interfere with the subsequent Claus process. The flow rate of COG or any $H_2S$ and $CO_2$ containing gas at which this problem arises in relation to the maximum gas flow rate which the absorption system was designed to treat can be termed the critical feed gas flow rate.

Although the liquid absorbent flow rate as a practice is proportioned to the gas flow rate, the liquid absorbent flow rate cannot be significantly varied with the hope of altering the contact time between the gas and the absorbent solution because the packing or bubble-cap trays within the absorption column are designed to permit a limited range of liquid flow rate through the column as are the pumps and piping. Moreover, the gas flow rate through the absorption volume, which flow determines the gas residence time, is the principal factor affecting contact time, not the absorbent flow. Regardless of how fast the absorbent solution is passing through the absorption volume, the gas stream from which $H_2S$ is to be removed will have a particular residence time in the absorption volume dependent upon the rate of the gas flowing through the absorption volume. During the time the gas is within the absorption volume it is contacting absorbent solution. Since the COG flow changes with the varying coke production requirements and whatever COG that is produced must be treated when produced, controlling the residence time by controlling the flow rate of the COG is impossible.

Accordingly, there is a need to selectively remove a gaseous component from a gas stream having a variable flow rate by absorption into an absorbent solution which also absorbs another gaseous component of the gas stream but at a different rate of absorption. Particularly, there is a need to selectively absorb $H_2S$ with an absorbent solution from a gas stream having a variable flow rate and containing $H_2S$ and $CO_2$ so as to maintain or control the relative concentration of $H_2S$ and $CO_2$ in the absorbent solution. More particularly, there is a need to maintain the concentration of $H_2S$ in the acid gas stream derived from the treatment of COG so that a downstream Claus plant will not become inoperative when the COG flow rate significantly decreases.

SUMMARY OF THE INVENTION

The foregoing difficulties in efficient operation of a multicomponent gas absorption system exposed to a varying feed gas flow have now been obviated in accordance with the present invention. It has unexpectedly been found that a desired gaseous component from a multicomponent gas stream can be efficiently absorbed into an absorbent solution within a desired ratio range across a broad range of feed gas flow rates if the absorption volume is divided in the predetermined manner of the invention. This surprising result is obtained if the gas stream is countercurrently contacted with the absorbent solution in a total absorption volume which is divided into at least two individual absorption volumes, a first and second individual absorption volume, connected in series and having fluid passage means to allow the gas stream and absorbent solution to countercurrently flow through the connected individual absorption volumes. The two fluid streams, that is the gas stream and the absorbent solution, are passed through the total absorption volume in opposite directions from opposed ends. Fluid flow interruption means are provided so that the flow of one or both of the fluid streams can be determined, or controlled, through the first and second absorption volumes in a selected sequence. The fluid flow interruption means can be valve means located in the fluid passage means for controlling the flow of the gas stream or absorbent solution stream, or both, separator means to allow or prohibit the flow of one of the fluid streams through it between the absorption volumes while passing the other fluid stream, a combination of fluid valve means and separator means, or any other means whereby the flow of one of the fluid streams can be determined between the absorption volumes. Under normal conditions when the gas stream flows at the maximum rate for which the total absorption volume is designed, both fluid streams will traverse the entire series of connected absorption volumes. Accordingly, being at the maximum flow rate the gas stream will have a minimum contact or residence time within the total absorption volume. When the gas stream flow rate decreases the residence time will correspondingly increase because it will take the gas longer to traverse the same total volume at a lesser flow rate.

Therefore, to maintain the residence time during which the gas stream contacts the liquid absorbent closer to that for which the absorption system was designed and to maintain the ratio of the absorbed gaseous component concentrations, one of the fluid streams can be redirected to bypass one of the individual absorption volumes in the total absorption volume. Thus, either the gas stream or the absorbent solution stream will traverse only one of the individual absorption volumes while the other fluid stream will still traverse the total absorption volume. As a result the gas stream, which now has a reduced flow rate, and the liquid absorbent solution contact each other in a smaller absorption volume or, equivalently, for a lesser contact or residence time than would be the result if the reduced gas flow intimately contacted the absorbent liquid throughout the total absorption volume. It is also possible to have both fluid streams bypass the same individual absorption volume and countercurrently flow through only the other individual absorption volume. The preferred method determines the passage of the absorbent solution through only one of the individual absorption volumes while the gas stream passes through the total absorption volume.

Such determining, or redirecting, of the fluid streams can be accomplished in two ways. One method is to alter the point at which the fluid stream enters the total absorption volume by passage into an individual absorption volume. The fluid stream is redirected to enter another individual absorption volume located in the individual absorption volume series composing the total absorption volume further downstream from its point of entry when the fluid stream traverses the total absorption volume. Another possibility is to alter the point at which the fluid stream exits the total absorption volume by passage from an individual absorption volume. This is accomplished by exiting the fluid stream from another individual absorption volume located in the individual absorption volume series composing the total absorption volume further upstream from its point of exit when the fluid stream traverses the total absorption volume.

The total absorption volume can be divided into individual absorption volumes of equal volumes or unequal volumes of any desired ratio. Thus, by the proper selection of the relative volume sizes, one of the fluid streams can be redirected to enter or exit another individual absorption volume when the gas stream flow varies such that the resulting gas-liquid contact or residence time will produce a concentration of the desired gaseous component in the absorbent solution relative to other less desired absorbed gaseous components which is the same as that occurring when the maximum gas flow contacts absorbent solution in the total absorption volume or which is within some predetermined acceptable range.

There may be two or more individual absorption volumes composing a total absorption volume having equal or unequal volumes or combinations of equal and unequal volumes. When the total absorption volume comprises a plurality of these individual absorption volumes, one or more may be effectively eliminated in a sequentially cumulative manner by redirecting the feeding or exiting of one of the fluid streams in a stepwise fashion along the series of connected individual absorption volumes. With such an apparatus and method the absorption volume in which gas-liquid contact occurs can be decreased in small increments in a stepwise manner as the gas flow continues to decrease in order to maintain a nearly constant residence or contact time for the decreasing gas flow, thus maintaining a nearly constant concentration of the desired gaseous component relative to the other absorbed components in the absorbent solution.

The invention has been described in the context of the gas stream flow rate decreasing, but the invention is also applicable to a gas stream flow rate which is increasing or, for that matter, is simply varying. A total absorption volume, which has the capacity to treat at least the maximum gas flow anticipated with a plurality of individual absorption volumes connected in series, can be operated to sequentially add or subtract individual absorption volumes in a manner responsive to the variations in the gas stream flow thereby maintaining the concentration of the desired gaseous component in the absorbent solution relative to the other less desired absorbed gaseous components. A fluid stream, preferably the absorbent solution, can be redirected to enter or exit different individual absorption volumes responsive to the varying gas flow to provide an effective gas-liquid contact volume that keeps the residence time of the gas stream nearly constant as its flow rate varies.

It is preferred that the individual absorption volumes which are connected in series and compose the total absorption volume be a series of split-bed absorbers and that the total absorption volume be housed in one absorber column, although this need not be the case. The individual absorption volumes may be any well-known absorption volumes such as packed beds or bubble-cap trays and the like that provide efficient and intimate gas-liquid contact.

The present invention is particularly applicable to the processing of an $H_2S$ and $CO_2$ containing industrial gas stream by an absorbent solution, such as an alkanolamine solution, that absorbs $H_2S$ and $CO_2$ at different rates in an absorption/desorption step. More particularly the invention is applicable to the processing of coke oven gas (COG) by a monoethanolamine (MEA) absorption-desorption step to remove $H_2S$ and the less desirable $CO_2$ from the gas stream followed by a Claus-type sulfur recovery step. A particular MEA-Claus tandem process will be designed to handle, at a selected $H_2S:CO_2$ absorption ratio and subsequent $H_2S:CO_2$ concentration ratio in the desorbed gas stream, the maximum expected COG flow containing anticipated concentration ranges of $CO_2$, $H_2S$ and HCN.

While the following description pertains to a COG, it will be understood that the gas stream can be any $H_2S$ and $CO_2$ containing gas stream.

In presently known apparatus, a lessened COG flow results in a longer residence time of the COG in contact with the absorbent solution in the designed absorption volume, thus causing more of the $CO_2$ present in the feed COG to be absorbed because the relative absorption of $CO_2$ to $H_2S$ increases rapidly as the residence time increases. Upon desorption, the $CO_2$ content of the liberated foul acid gas may attain such a concentration that its dilution of the combustion gases in the Claus reaction interferes with the plant's operation. The flow rate of COG at which this problem arises can be termed the critical COG flow rate which, if divided by the maximum COG flow rate that the particular MEA absorption-desorption system is designed to treat and multiplied by 100, can be called the critical percentage of COG flow rate. Since the total or maximum absorber volume can treat the maximum COG flow, the critical percentage of COG flow rate can equivalently be termed the critical percentage of the absorber capacity since there is a direct relationship between the two. These critical percentages will vary from system to system depending upon the designed operating parameters.

In general, it may be stated that the relative sizing of the first and second and any subsequent individual absorption volumes must be such that the gaseous components of the gas stream, e.g. $CO_2$ and $H_2S$ in COG, are absorbed within an acceptable ratio from the gas flows to be treated by providing a proper residence time of the gas in the individual absorption volumes in which gas-absorbent solution contact occurs. The sum of the individual absorption volumes in which this gas-liquid contact occurs can be termed the effective absorption volume. In the case of $CO_2$ and $H_2S$ in COG the amount of $CO_2$ absorbed can be reduced in proportion to the progressive reduction in the size of the effective absorption volume in response to the reduced gas flow. The greater the reduction in effective absorption volume the smaller the resulting proportion of $CO_2$ absorbed. While less $H_2S$ will also be absorbed in this smaller effective absorption volume, the degree to which $H_2S$ is affected is considerably less than for $CO_2$ and can, therefore, be ignored. Thus, the maintaining of an $H_2S:CO_2$ concentration ratio in the desorbed acid gas that will sustain operation of the Claus plant is achieved by limiting the residence time of the gas in an absorption volume by having gas-liquid contact occur in a smaller absorption volume when the gas flow rate decreases.

However, in order to meet any given specification for $H_2S$ emission is it also necessary to have some minimum residence time in the absorption volume and consequently the absorption volume of the second and any succeeding individual absorption volumes cannot be too small to absorb the required amount of $H_2S$ from the gas flow. That is to say, the gas flow rate at which the switch to the smaller absorption volume, which comprises the second and any succeeding individual absorption volumes, is accomplished must not be too great for the capacity of this smaller absorption volume to absorb the required amount of $H_2S$ from it. Otherwise, this smaller absorption volume will be overburdened and the desulfurized gas stream will contain too much $H_2S$. When the $H_2S$ content of the desulfurized gas stream is not a consideration, the effective absorption volume can decrease in fairly large increments as the gas flow decreases for a relatively high ratio of $H_2S$ to $CO_2$ will be ensured. Thus, the absorption of enough $H_2S$ from the gas stream to meet any $H_2S$ emission specifications has been taken into account and the minimum size of the smaller effective absorption volume to achieve this result at a particular reduced gas flow rate has been established.

Accordingly, when maximum absorption of $H_2S$ is desired along with maintaining an acceptable $H_2S:CO_2$ concentration range in the acid gas stream, it is usually desirable to use smaller increments, or decrements as the case may be, in the sizing of the effective absorption volume. Furthermore, it will usually be desirable for the critical percentage of the COG flow rate for the total absorption volume or the preceeding effective absorption volume to be somewhat smaller numerically than the size of the smaller succeeding effective absorption volume expressed as a percentage of the original total absorption volume. In other words, the minimum effective operating level of the total absorption volume or the preceeding absorption volume should overlap with the maximum effective operating level of the second or succeeding absorption volume. In this manner a buffer-zone is provided so that the gas stream flow can be switched from an absorption volume to a smaller absorption volume as the gas flow decreases without ever falling below the critical gas flow rate for an absorption volume by changing over a little too late or without emitting too much $H_2S$ in the desulfurized gas stream by changing over too soon.

The switch to a smaller absorption volume in which the COG can intimately contact the absorbent solution is performed when the COG flow drops to within a 10 percentage point range of the critical percent COG flow rate and preferably within a 5 percentage point range. It is most preferred that at the very latest, the smaller absorption volume should be utilized when the flow rate reaches the critical COG flow rate. To maintain an acceptable $H_2S$ concentrations in the desulfurized gas and an acceptable $H_2S:CO_2$ concentration in the acid foul gas, this smaller absorption volume is sized to be that percentage of the original total absorption volume which is within a range that is 10 percentage points above the percentage of the maximum COG flow rate at which the switch to the smaller absorption volume is made and preferably at least within a 5 percentage point range. When the only consideration is maintaining an $H_2S:CO_2$ concentration in the acid gas, the smaller absorption volume is sized to be that percentage of the original total absorption volume which is within a 10 percentage point range above and below the percentage of the maximum COG flow rate at which the switch to the smaller absorption volume is made and perferably, at least within a 5 percentage point range. In both instances, it is most preferred that at the very least the smaller absorption volume as a percentage of the original total absorption volume should be numerically equal to the percentage of the maximum COG flow rate at which the change to the smaller absorption is made.

Consequently, the reduced COG flow will contact the absorbent solution in this smaller absorption volume resulting in a lesser residence time as opposed to the residence time of the reduced COG flow in the original total absorption volume. Therefore, less $CO_2$ will be absorbed in relation to $H_2S$ and the desorbed acid gas will have a relative concentration of $H_2S:CO_2$ sufficient to maintain the Claus reactor operative. In fact, when the reduced COG flow is contacted in a smaller absorption volume which is the same fraction or percentage of the original maximum absorption volume as the reduced COG flow rate is of the maximum COG flow rate, the $H_2S:CO_2$ absorbed into the solution and in the desorbed acid foul gas will be the same as the $H_2S:CO_2$ ratio resulting from the maximum COG flowing through the maximum absorption volume. Thus an efficient turndown is effected while maintaining the $H_2S:CO_2$ ratio in the acid gas stream to the Claus plant.

This smaller absorption volume will be able to handle a decreasing COG flow below the first critical COG flow rate of the original maximum absorption volume until its own critical operating point of reduced COG flow is attained. The gas flow rate through the smaller absorption volume below which a desorbed acid gas stream cannot be obtained to sustain the Claus reactor is called the second critical percentage of the maximum COG flow.

The invention provides a method of maintaining at least the mimimum concentration of $H_2S$ in the acid gas stream to keep the Claus plant operative as the COG flow decreases by contacting the COG with absorbent solution in a smaller absorption zone.

DETAILED DESCRIPTION OF THE INVENTION

The present invention solves the problem of selectively removing a gaseous component from a gas stream containing at least two gaseous components and having a variable flow rate by absorption into an absorbent solution which also absorbs another gaseous component of the gas stream but at a different rate of absorption. The invention accomplishes this by passing the gas stream through a total absorption volume comprised of at least two individual absorption volumes connected in series and having fluid passage means which permits the two fluid streams, i.e. the gas stream and an absorbent solution, to countercurrently flow through the connected individual absorption volumes. As the flow rate of the gas stream varies, fluid flow interruption means is adjusted to redirect the flow of one of the fluid streams either to incorporate additional individual absorption volumes when the gas flow increases or to eliminate individual absorption volumes when the gas flow decreases thereby maintaining more constant the residence time of the gas stream in contact with the absorbent solution in an absorption zone and in turn keeping the relative concentrations of the desired component and less desired components more constant.

Figure 1:
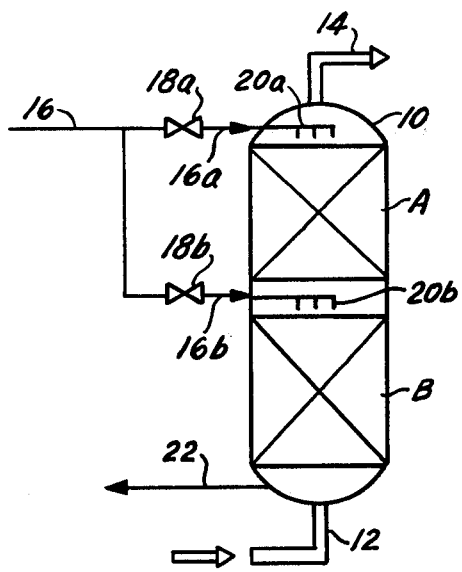
FIGS. 1-7 show gas-liquid contact apparatus for the practice of this invention. In the FIGURES similar structures are given the same numerical identification.

FIG. 1 shows an absorption apparatus used in the practice of the invention. Absorption column 10 contains a total absorption volume divided into two individual absorption volumes A and B which can be packed split beds or split volumes containing bubble cap trays or other gas-liquid contacting apparatus known in the art. The total absorption volume is dimensioned to treat a maximum gas flow. The individual absorption volumes A and B are segregated but connected in series to allow the free countercurrent flow of a gas stream and an absorbent solution therethrough. Gas inlet line 12 introduces the gas stream into the bottom of absorption column 10 below absorption volume B. Gas exit line 14 leaves the top of absorption column 10 above absorption volume A. Absorbent solution line 16 which carries regenerated or lean absorbent solution splits into lines 16a and 16b containing valves 18a and 18b respectively. Line 16a enters absorption column 10 and connects with liquid distributor 20a situated above absorption volume A and line 16b enters to connect with liquid distributor 20b situated above absorption volume B. Line 22 carries loaded or rich absorbent solution from the bottom of absorption column 10.

A gas stream containing at least two gaseous components which are absorbed into an absorbent solution at different rates passes through gas inlet line 12 into absorption column 10 below absorption volume B. The gas ascends through absorption volume B and then through absorption volume A in which volumes it countercurrently contacts an absorbent solution before it exits through gas line 14 as a gas stream from which the desired gaseous component has been selectively removed. When the gas flow is at its maximum, the absorbent solution passes through line 16, into line 16a via valve 18a which is open and into liquid distributor 20a to be spread throughout absorption volume A. Valve 18b is closed preventing any absorbent solution from being introduced into the top of absorption volume B from line 16. Thus, the absorbent solution descends through absorption volume A and then through absorption volume B to exit as a rich absorbent solution through line 22 after intimately contacting the upwardly flowing gas. Therefore, the gas stream will have contacted the absorbent solution in both individual absorption volumes A and B, the total absorption volume.

When the gas flow rate decreases, slower passage through the total absorption volume results in a longer residence time and, accordingly, an increase in the relative concentration of the less desired gaseous component to the desired gaseous component in the absorbent solution. Consequently, at some point prior to the gas stream flow decreasing to that level which yields an unacceptable ratio of undesired to desired absorbed gas components in the absorbent solution, valve 18a is closed and valve 18b is opened to cause the absorbent solution to flow through line 16b into liquid distributor 20b whereby the absorbent solution descends through only absorption volume B while the gas stream still ascends through both individual absorption volumes. Gas-liquid contact occurs only in absorption volume B yielding a lesser contact time for the reduced gas flow than if the absorbent solution traversed the total absorption volume. Thus the selective absorption of the desired gaseous component is maintained through the lesser residence time. If the gas flow increases to the rate at which the single individual absorption volume is inadequate to sufficiently remove the desired gaseous component, the absorbent solution can be redirected back through line 16a by closing valve 18b and opening valve 18a to utilize the total absorption capacity of column 10, i.e. individual absorption volumes A and B.

Figure 2:
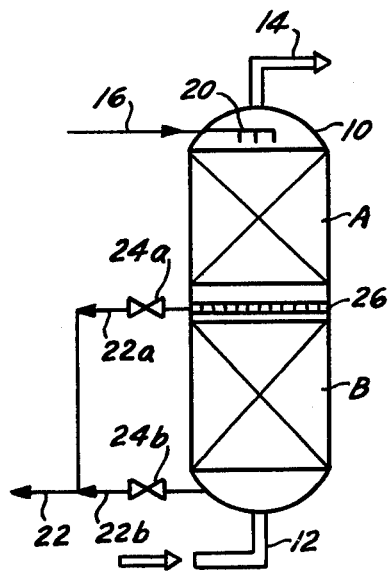
Figures 2A, 3A, 4A:
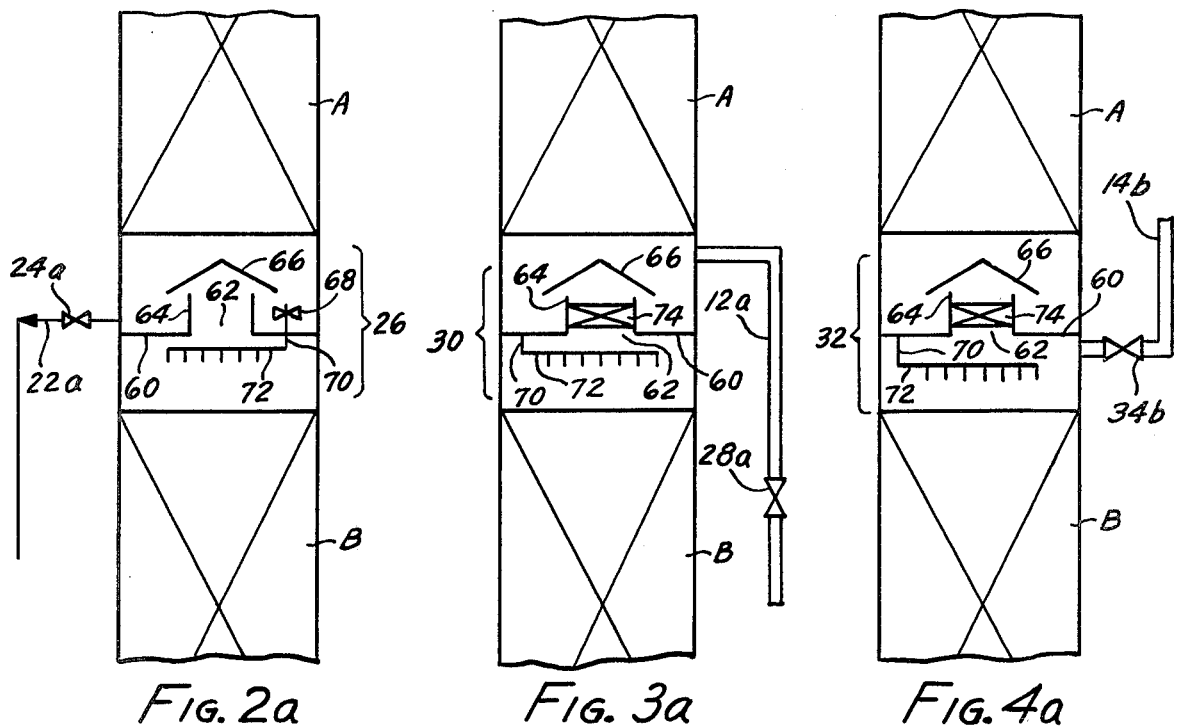
FIGS. 2a, 3a and 4a are examples of the separator means depicted in FIGS. 2, 3 and 4 respectively.

Another embodiment in which the flow of the absorbent solution is altered to increase or decrease the absorption volume in use is shown in FIG. 2. Similar structures in FIG. 2 are given the same numerical identifications as in FIG. 1. Absorption column 10 contains a total absorption volume divided into individual absorption volumes A and B by separator means 26 which allows the gas stream to constantly ascend through it but can be controlled to either pass absorbent solution or retain it so as to prevent its flow into the lower absorption volume B. An example of separator means 26 is shown in FIG. 2a. As shown in FIG. 2a a separating plate 60 is located transversely across the longitudinal axis of the absorber column and contains opening 62 having chimney 64 to permit gas passage and collect downwardly flowing absorbent solution. Covering 66 prevents descending absorbent solution from passing through opening 62. Valve 68 regulates absorbent solution flow through line 70 to liquid distributor 72 above absorption volume B. As shown in FIG. 2 gas inlet line 72 enters the bottom of column 10 and the gas exit line 14 leaves the top of the column. Absorbent solution line 16 enters the column connecting with liquid distributor 20 above absorption volume A. Line 22a and opened valve 24a remove from column 10 rich absorbent solution which has passed through absorption volume A but has collected on separator means 26 when the separator means is adjusted to prevent liquid flow into absorption volume B in conjunction with opened valve 24a. Line 22b and opened valve 24b conduct rich absorbent solution when the absorbent solution is allowed to pass through separator means 26 and absorption volume B. Exit lines 22a and 22b merge into rich absorbent exit line 22.

When the gas stream is at its maximum flow rate, it enters absorption column 10 through gas inlet 12 and flows upward through absorption volume B, separator means 26 and absorption volume A exiting through line 14. Absorbent solution passes through line 16 into liquid distributor 20 and is distributed over absorption volume A through which it descends and then through separator means 26 which is adjusted to allow for descending liquid flow while valve 24a is closed. From separator means 26 the absorbent solution flows downwardly through absorption volume B. After having contacted the ascending gas stream in the two absorption volumes, the now rich absorbent solution leaves the column through opened valve 24b and line 22b into line 22.

When the gas flow rate decreases to a level at which the relative concentration of the desired gaseous component to the concentration of the less desired gaseous component in the absorbent solution becomes unacceptable, valve 24b is closed, valve 24a is opened and separator means 26 is adjusted to collect the absorbent solution which has flowed through absorption volume A and not permit its passage into absorption volume B while still permitting the ascending gas stream free flow therethrough. The rich absorbent solution from absorption volume A accumulates on separator means 26 and is withdrawn via opened valve 24a and line 22a into exit line 22. Thus the gas stream and absorbent solution only contact each other within absorption volume A resulting in a lesser contact time for the reduced gas flow than if the absorbent solution flowed through both absorption volumes. This resultant decreased residence time for the reduced gas flow maintains the selective absorption of the desired gaseous component. When the gas stream flow increases, the absorbent solution is merely allowed to pass through separator means 26 into and through absorption volume B so that the total absorption capacity of column 10 is utilized.

Figure 3:
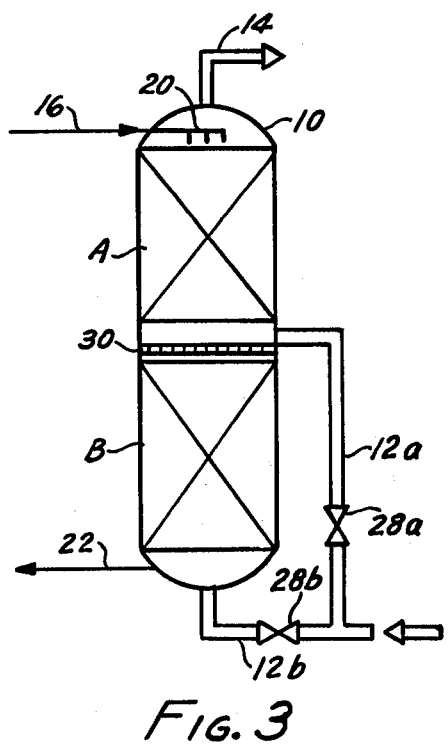
Figure 4:
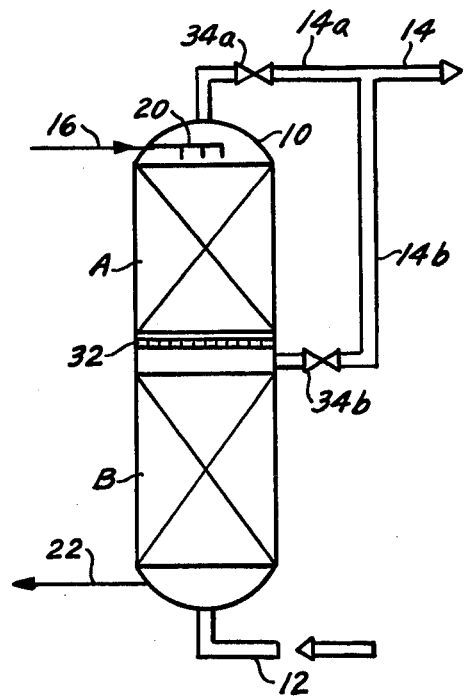

Instead of altering the absorbent solution flow, FIGS. 3 and 4 show embodiments in which the gas stream flow is redirected. In FIG. 3 absorption column 10 again has individual absorption volumes A and B, absorbent solution feed line 16 connected to liquid distributor 20, rich absorbent solution exit line 22 and gas exit line 14. Separator means 30 allows for the passage of the absorbent solution through it in a descending direction and the gas stream in an ascending direction. That is to say the gas stream can flow upwardly through it from absorption volume B into absorption volume A while the absorbent passes downwardly through it.

An example of separator means 30 is shown in FIG. 3a. A separating plate 60 positioned transversely across the longitudinal axis of the absorption column contains opening 62 having chimney 64 to permit gas passage and collect absorbent solution descending from absorption volume A. Covering 66 prevents absorbent solution from passing through opening 62. Valve 74, which can be a gate valve or a sliding plate, regulates the gas flow through opening 62. Line 70 conducts all of the collected absorbent solution to liquid distributor 72 above absorption volume B. Gas feed line 12 splits into lines 12a and 12b having valves 28a and 28b, respectively. Gas feed line 12a enters the absorption column above separator means 30 and below absorption volume A. At maximum gas flow with valve 28a closed, the gas stream passes through gas feed line 12, opened valve 28b and line 12b into absorption column 10 where it ascends through absorption volumes B and A composing the total absorption volume to countercurrently contact the absorbent solution supplied to the total absorption volume through feed line 16 and liquid distributor 20. When the gas flow decreases, valve 28b is closed and valve 28a is opened so that the reduced gas flow now by-passes absorption volume B and gas-liquid contact occurs only in absorption volume A.

Rather than introducing the feed gas into the absorption column at another absorption volume as in FIG. 3, absorption column 10 in FIG. 4 permits the treated gas to exit from an individual absorption volume which is upstream with respect to the gas exit line which vents the gas when the total absorption volume is utilized. Absorption column 10 comprises absorption volumes A and B, absorbent solution feed line 16 connected to liquid distributor 20, rich absorbent solution exit line 22 and feed gas line 12. Gas exit line 14a emerges from absorption column 10 above absorption volume A and contains valve 34a. Gas exit line 14b emerges from the column below absorption volume A and contains valve 34b. Separator means 32 is interposed below absorption volume A and above gas exit line 14b absorption volume B. Separator means 32 is designed to permit the passage of absorbent solution through it at all times but to control the passage of the gas stream by its manipulation in cooperation with the opening and closing of valves 34a and 34b. When separator means 32 is operated to allow the gas stream from absorption volume B to flow through it into absorption volume A, valve 34b is closed and valve 34a is open while this order is reversed when separator means 32 is operated to prevent gas passage. Gas exit lines 14a and 14b merge into gas exit line 14.

An example of separator means 32 is shown in FIG. 4a and is identical to separator means 30 of FIG. 3a described hereinbefore. FIG. 4a is presented to show the location of gas exit line 14b as being below separating plate 60.

At maximum gas flow and utilization of the total absorption volume of absorption column 10, the gas stream flows through gas feed line 12, absorption volume B and separator means 32 which has been adjusted to permit the countercurrent flow of both the gas stream and the absorbent solution with valve 34b closed. The gas stream continues through absorption volume A to exit via opened valve 34a and lines 14a and 14. Absorbent solution is introduced through line 16 and liquid distributor 20 which spreads the absorbent solution throughout absorption volume A. The absorbent solution descends through absorption volume A, passes via separator means 32 into and then through absorption volume B and emerges from absorption column 10 as a rich absorbent solution via line 22 after having intimately contacted the upwardly flowing gas stream in both individual absorption volumes. When the gas stream flow rate decreases to the level at which the emerging rich absorbent solution contains an unacceptable relative concentration of desired to undesired absorbed gaseous components, separator means 32 in conjunction with the opening of valve 34b and closing of valve 34a is adjusted to prevent the flow of gas through it while still conducting the absorbent solution. As a consequence, the two countercurrently flowing fluid streams intimately contact each other only in absorption volume B. Upon an increase in the gas flow rate, separator means 32 and valves 34a and 34b are cooperatively adjusted to afford usage of the total absorption volume.

Valves 18a and 18b in FIG. 1, 24a and 24b in FIG. 2, 28a and 28b in FIG. 3 and 34a and 34b in FIG. 4 could be a single three-way valve.

Figure 5:
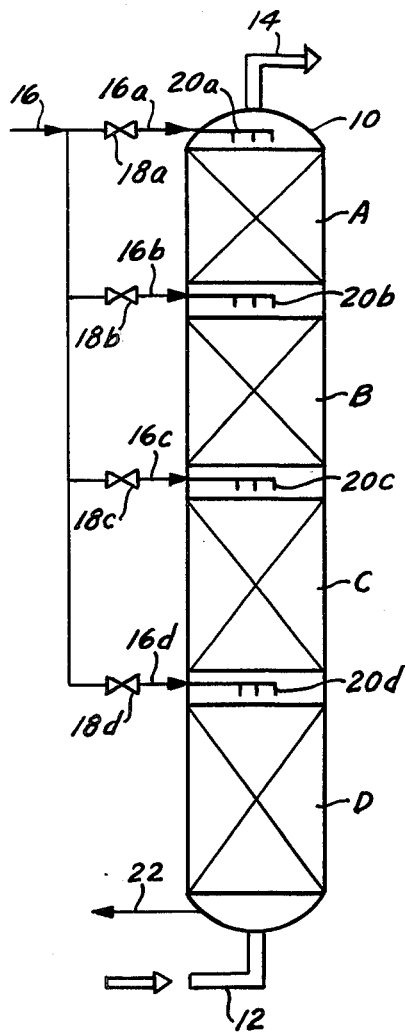

FIG. 5 is like the embodiment depicted in FIG. 1 except that the absorption column contains four individual absorption volumes A, B, C and D composing the total absorption volume of the column. Absorbent solution feed line 16 branches into four separate feed lines 16a, 16b, 16c and 16d each having a control valve 18 and connected to a liquid distributor 20, each distributor positioned to service one of the individual absorption volumes. In the practice of this embodiment of the invention one valve will be open to supply absorbent solution to the absorption volumes while the other three valves remain closed.

As described previously, for utilization of the total absorption volume of the column at or near maximum gas flow, the absorbent solution flows through line 16, opened valve 18a, line 16a and distributor 20a. Valves 18b, 18c and 18d are closed preventing any absorbent soltuion from flowing through distributors 20b, 20c and 20d. The absorbent solution is spread throughout absorption volume A and cascades downwardly through it continuing on down the column successively through absorption volumes B, C, and D to exit the column via rich absorbent solution line 22. At the same time, the gas stream passes through gas feed line 12 into the absorption column 10 ascending successively through absorption volumes D, C, B and A effecting intimate countercurrent contact with the descending absorbent solution in the total absorption volume.

The absorption column and its total absorption volume are designed and dimensioned to treat the maximum gas flow to afford a rich absorbent solution exiting the column and containing a predetermined ratio of desired gaseous component to undesired gaseous component dissolved in the absorbent solution, or at least a ratio within an acceptable range. When the gas flow rate decreases and the rich absorbent solution no longer contains an acceptable ratio of dissolved gaseous components because of the increased residence time, absorption volume A can be eliminated by closing valve 18a and opening valve 18b so that the absorbent solution flows through line 16b and liquid distributor 20b to descend through only absorption volumes B, C and D to contact the gas stream. If the gas flow rate continues to decrease whereby the ratio of dissolved gaseous components is not within an acceptable range in the absorbent solution, absorption volume B and finally absorption volume C and be sequentially eliminated until the absorbent solution and gas stream contact each other in an effective absorption volume for a residence time which yields an acceptable concentration of desired gaseous component to undersired gaseous components in the absorbent solution, or a desorbed gas stream if there be one.

By utilizing more than two individual absorption volumes to compose a total absorption volume, an absorption column will be able to adequately handle and treat a gas stream whose flow rate may decrease greatly by sequentially removing individual absorption volumes to afford a progressively smaller volume in which gas-liquid contact occurs. Moreover, the greater the number of individual absorption volumes in the total absorption volume the greater the flexibility of the absorption system to accommodate a varying gas flow and to produce an absorbent solution effluent having an acceptable ratio of dissolved gaseous components. By having a large number of individual absorption volumes composing a total absorption volume, the addition or elimination of one individual absorption volume after another in response to a comparable variation in the gas flow will effect a nearly proportionate change in the effective absorption volume in which gas-liquid contact occurs, thus resulting in a capability to maintain a more constant residence time and achieving a more constant concentration of the desired gaseous component with respect to the concentration of the less desired gaseous components in the absorbent solution.

Figure 6:
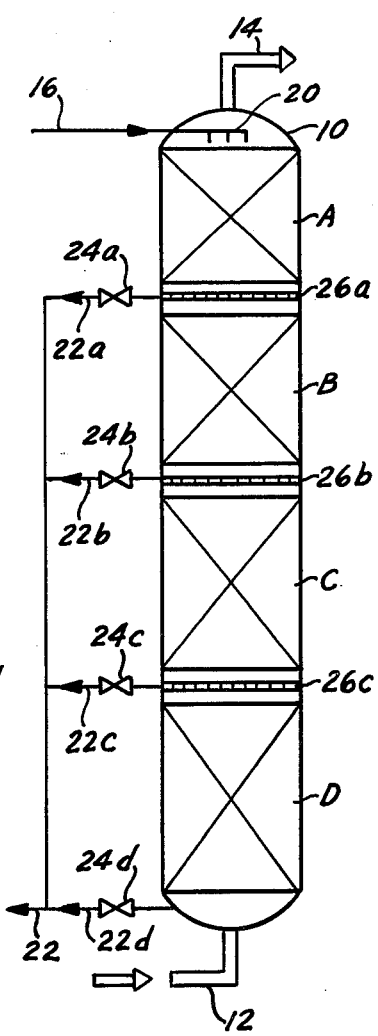

Similar results can be achieved with the absorption column 10 shown in FIG. 6. This column is like the absorption column in FIG. 2 but contains four individual absorption volumes each with an absorbent solution exit line 22, namely exit lines 22a, 22b, 22c and 22d having valves 24a, 24b, 24c and 24d respectively, emerging from the column below it and a separator means 26 between adjacent individual absorption volumes. It is obvious that the total absorption volume in this embodiment can be sequentially decreased by the stepwise removal of absorption volumes D, C and then B similar to the procedure described for the absorption column of FIG. 2. The individual absorption volumes in the column in FIG. 6 are sequentially eliminated in reverse compared with the column in FIG. 5.

Figure 7:
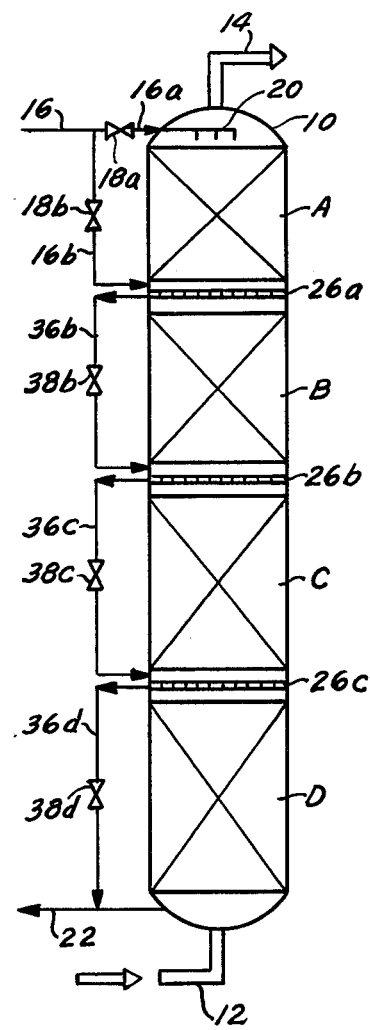

While the absorpton columns shown in FIGS. 5 and 6 operate by removing individual absorption volumes in an ordered sequence proceeding from one end of the column, FIG. 7 shows an absorption column containing four individual absorption volumes A, B, C and D which allows for the removal of one or more individual absorption volumes from the middle of the series of connected individual absorption volumes. In addition to the common elements which have previously been described and identically numbered in FIGS. 5 and 6, the column in FIG. 7 contains by-pass lines 36b, 36c and 36d with valves 38b, 38c and 38d, respectively. The by-pass lines communicate with and operate in conjunction with their associated separator means 26a, 26b and 26c which can allow for the countercurrent flow of the two fluids through it or can be adjusted to allow passage of the gas stream while preventing passage of the absorbent solution.

To utilize the total absorption volume of the column 10, valves 18b, 38b, 38c and 38d are closed and separator means 26a, 26b and 26c and valve 18a are opened to allow the gas stream to ascend and the absorbent solution to descend through all of the individual absorption volumes. If absorption volume B were chosen to be eliminated when a lesser effective absorption volume is needed, separator means 26a would be adjusted to retain the downward flowing absorbent solution from absorption volume A while still passing the gas stream through it. In concert with the separator means adjustment, valve 38b is opened to allow the accumulated absorbent solution to flow through by-pass line 36b. The absorbent solution detours around absorption volume B and re-enters the column above separator means 26b through which it can still flow. In a similar manner, absorption volume C can be removed from the effective gas-liquid contacting volume, or both volumes B and C can be by-passed simultaneously.

An absorption column having a plurality of individual absorption volumes connected in series to compose a total absorption volume and incorporating the features of FIGS. 5, 6 and 7 could be constructed. With such a column it would be possible to selectively remove any single individual absorption volume or any combination of individual absorption volumes in any chosen sequence from the effective absorption capacity of the column. Whereas the above-described absorption columns involve the redirecting of the absorbent solution flow, the same results can be achieved by similar redirecting of the gas stream. However, it is preferable to work with the absorbent solution because the piping and valves needed are less cumbersome and much less expensive than similar hardware for gas lines.

In addition to being able to maintain or control the concentration of the desired gaseous component with respect to the concentration of the less desired gaseous components in the absorbent solution as the flow rate of the gas stream varies by determining the passage of the fluid streams through the serially connected individual absorption volumes, a finer degree of such control can be achieved by the judicious selection of the relative volumes of the individual absorption volumes that compose the total absorption volume. The individual absorption volumes can be dimensioned so that the addition or subtraction of them singly or in combination will yield a new, precalculated absorption volume for gas-liquid contact which will afford a desired residence time for a particular flow rate of the variably flowing gas stream that in turn will yield an acceptable concentration ratio of desired gaseous component to less desired gaseous component in the loaded absorbent solution or in a subsequently desorbed gas stream. This acceptable concentration ratio of the desired to less desired gaseous components in the absorbent solution or desorbed gas stream is a concentration ratio that permits the absorbent solution or desorbed gas stream to be utilized in a following step or process whereby the step or procedure is maintained operative. "Operative" means that the results from the subsequent step or process are acceptable or the apparatus for performing this step or process is kept functioning.

The gas flow rate through an effective absorption volume below which a loaded absorbent solution or desorbed gas stream is obtained that results in the following step or process becoming inoperative is the critical gas flow rate for that effective absorption volume. If the critical gas flow rate is divided by the maximum gas flow rate which the total absorption volume was designed to treat and is multiplied by 100, the critical percentage gas flow rate is obtained. This concept applies to an individual absorption volume or any combination of individual absorption volumes forming an effective absorption volume. Therefore, a critical gas flow rate would exist for each effective absorption volume below which an unacceptable concentration ratio of desired to less desired gaseous components in the absorbent solution or desorbed gas stream is obtained. Before the gas flow decreases below this rate, the gas-liquid contact should be performed in another effective absorption volume, in this case a smaller absorption volume.

It will usually be desirable for the critical percentage gas flow rate for the original total absorption volume or the preceeding effective absorption volume to be numerically smaller than the size of the smaller succeeding effective absorption volume expressed as a percentage of the original total absorption volume. That is to say the minimum effective operating level of the total absorption volume or preceeding absorption volume for maintaining the subsequent step or process operative should overlap with the maximum effective operating level of the second or succeeding absorption volume. Such practice provides a safety zone so that the gas-liquid contact can be switched from one absorption volume to a smaller absorption volume as the gas flow rate decreases without ever falling below the critical gas flow rate for an effective absorption volume by switching too late. The gas flow rate at which the switch is performed is that flow rate which is within a 10 percentage point range of the critical percentage flow rate, and preferably within a 5 percentage point range. It is most preferred that at the very latest, the switch to the smaller absorption volume should be accomplished when the gas flow rate reaches the critical gas flow rate.

As the gas flow increases the capacity, or maximum effective operating level, of an effective absorption volume will be surpassed in that too much gas will pass through the effective absorption volume for the absorbent solution to remove almost all of the desired gaseous component. The treated gas stream emanating from the absorption volume will contain a relatively high concentration of desired gaseous component. Nevertheless, the loaded absorbent solution or desorbed gas stream will contain an acceptable concentration ratio of desired to less desired gaseous components. Accordingly, the smaller absorption volume need not be a minimum size. However, for most efficient operation an individual absorption volume should be added, i.e. the effective absorption volume should be increased in size, when the capacity of an effective absorption volume is exceeded as the gas flow increases.

The size of the smaller absorption volume should be that percentage of the original total absorption volume which is within a range that is 10 percentage points above and below the percentage of the maximum gas flow rate at which the change to the smaller absorption volume is made and preferably within a 5 percentage point range. Most preferably and for optimum efficiency the smaller absorption volume as a percentage of the total absorption volume should be numerically equal to the percentage of the maximum gas flow rate at which the switch to the smaller absorption volume is made.

Figure 9:
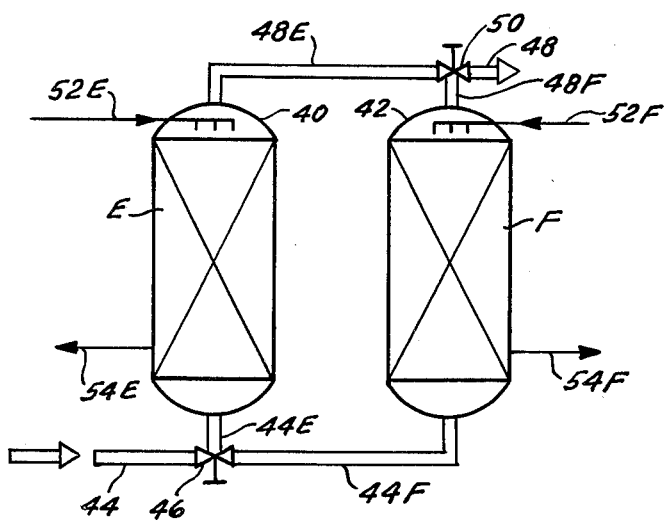
FIG. 9 is an embodiment of apparatus for the practice of the invention as applied to an $H_2S$ removal and sulfur recovery system.

In the foregoing description for determining the size of the smaller absorption volume and the flow rate of the gas stream at which gas-liquid contact is switched to the smaller absorption to maintain a concentration ratio of desired gaseous component to less desired gaseous component in the absorbent solution whereby the absorbent solution when utilized in a following process maintains the process operative, an individual absorption volume or a combination of serially connected individual absorption volumes, as the case may be, compose the total absorption volume and the smaller absorption volume, which is a part of the total absorption volume. The following process can be the liberation from the rich absorbent solution of a desorbed gas stream that is also used in a following process and maintains it operative. in addition, this advantage of performing the gas-liquid contact in a particularly dimensioned smaller absorption volume can be achieved in another embodiment in which the smaller absorption volume is a separate individual absorption volume connected in parallel to another absorption volume which is the total absorption volume. A further embodiment has the total absorption volume comprising two individual absorption volumes connected in parallel, one of the individual absorption volumes being the smaller absorption volume. Such parallel embodiments are depicted by the apparatus of FIG. 9 which is more fully explained hereinafter.

Particularly with respect to an $H_2S$ removal and sulfur recovery system, the value of careful selection of the absorption volume sizes can be demonstrated by the selective removal of $H_2S$ from an industrial gas stream which contains $H_2S$ and $CO_2$ and has a flow rate that varies up to a maximum. The $H_2S$ and $CO_2$ are selectively removed by absorption into an absorbent solution in a total absorption volume dimensioned to treat the maximum gas flow, the absorbent solution absorbing the $H_2S$ and $CO_2$ at different rates. The resultant rich absorbent solution is regenerated to produce an $H_2S$ and $CO_2$ containing acid foul gas stream which is passed to a sulfur recovery plant such as a Claus reactor.

A decreased gas flow results in a longer residence time of the industrial gas in the absorbent solution thus causing more of the $CO_2$ present in the feed gas to be absorbed. Since the relative absorption of $H_2S$ to $CO_2$ decreases rapidly as the residence time increases, the $CO_2$ content of the liberated foul gas from the desorption stage during regeneration of the absorbent solution may attain such a concentration that it detrimentally dilutes the combustion gases in the Claus reactor. The Claus plant is designed to partially burn the $H_2S$ to $SO_2$ to maintain an $H_2S:SO_2$ ratio of 2:1. A dilution of the foul gas with increased $CO_2$ content will eventually result in insufficient $H_2S$ being present to maintain combustion in the Claus plant burner.

Illustrative of this problem is an $H_2S$ removal and sulfur recovery system for treating COG currently in operation in which the $H_2S$ is removed in an absorption stage comprising two absorbers of equal absorption volumes connected in parallel. The COG flow is split equally between the two absorbers which can each handle 50% of the maximum COG flow. At maximum COG flow, the rich absorbent solution emerging from the absorbers is regenerated in a desorption stage to liberate an acid foul gas stream containing $H_2S$ and $CO_2$ in a ratio that will sustain the Claus plant operation. When the COG flow rate decreases below 70% of maximum, the liberated foul gas has an $H_2S$ constituency that will not maintain the Claus plant operative. At that point one-half of the COG flow, or 35% of the maximum COG flow rate, is passing through each absorber. If one of the absorbers were shut down so that all the COG passed through a single absorber, a desulfurized COG stream having an excessive $H_2S$ content would leave the absorber. The single absorber was designed to desulfurize 50% of maximum COG flow, but 70% would then be passing through it. While the foul gas stream would now contain sufficient $H_2S$ to satisfy the Claus plant, the single absorber would not be emitting an environmentally acceptable desulfurized gas until the COG flow rate fell to 50% of maximum. At 50% of maximum COG flow rate the single absorber will produce an acceptable desulfurized gas stream and an acceptable foul gas stream. Therefore, there exists a range from 50–70% of the maximum COG flow rate in which the $H_2S$ removal and sulfur recovery system will not effectively operate. An absorption column containing two split bed absorption volumes connected in series according to the broad inventive concept disclosed herein is not the total solution if they are of equal volumes because the gap from 50–70% of the maximum COG flow rate would still be present when one of the split bed absorption volumes was removed. The dimensioning of the split bed absorbers to permit effective turndown of the absorption capacity is demonstrated in FIG. 8 and described below.

Figure 8:
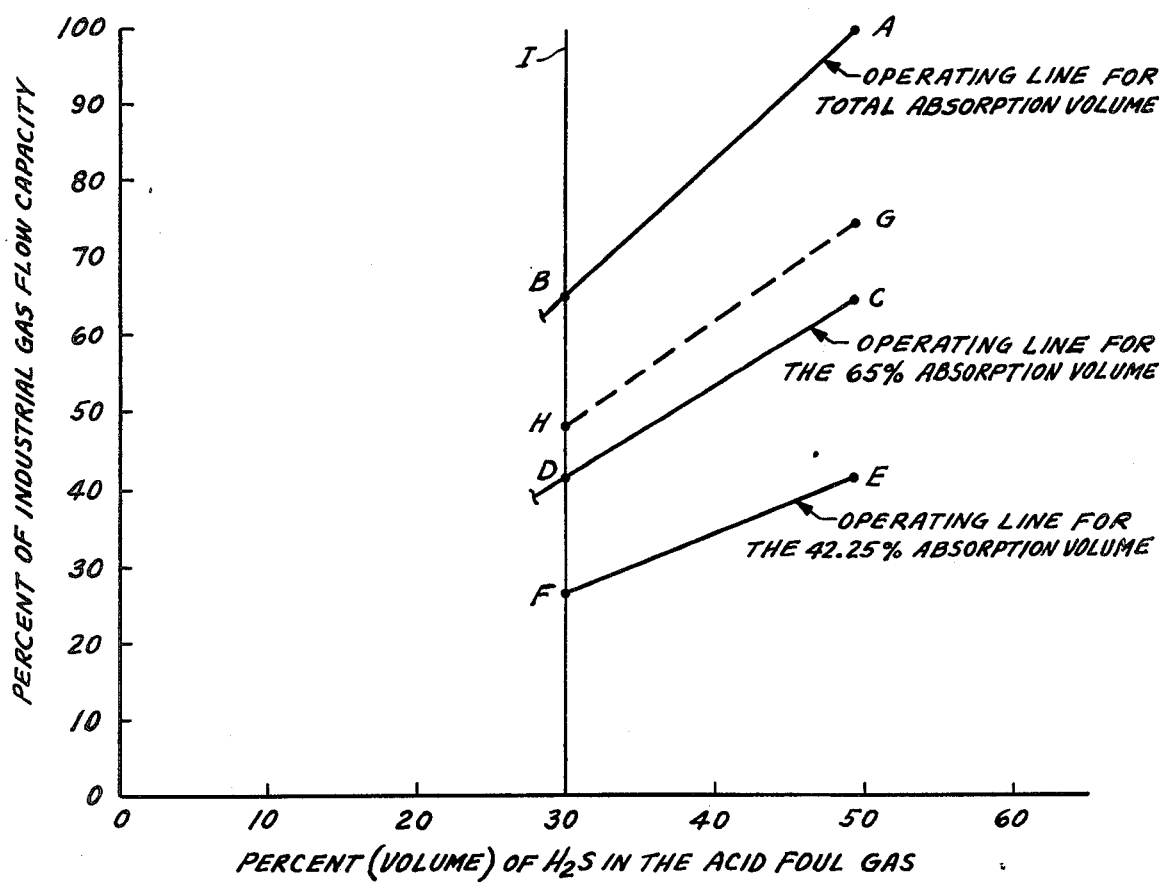
FIG. 8 is a graphic representation of two operating parameters for a hypothetical $H_2S$ removal system in tandem with a Claus type sulfur recovery plant.

FIG. 8 is a graphic representation of two operating factors of a typical $H_2S$ removal and sulfur recovery system discussed above, such as an alkanolamine absorption/desorption stage in tandem with a Claus reactor plant. The percentage of the industrial gas flow capacity is plotted versus the percentage (volume) of $H_2S$ in the acid foul gas which has been liberated from the absorbent solution that has treated the industrial gas. This hypothetical system is designed to handle the maximum industrial gas flow with a selected absorbent solution flow rate and total absorption volume to yield a calculated $H_2S:CO_2$ concentration in the foul gas upon desorption. For the system shown in FIG. 8 the absorbent solution flow rate is constant and flows through the total absorption volume at such a rate that the resulting $H_2S:CO_2$ concentration in the foul gas is 1:1 at maximum industrial gas flow. Therefore, point (A) on the graph represents 50% by volume of $H_2S$ in the foul gas at 100% industrial gas flow. The Claus reactor will operate so long as the foul gas contains a certain minimum content of $H_2S$. In this hypothetical system, the critical volume percent of $H_2S$ is 30%, shown by line I, and represents the limit of Claus plant operation. The plant will not operate in the area to the left of the line.

For the designed operating parameters for this system, it can be found that at an industrial gas flow rate which is 65% of the maximum the foul gas will contain the minimum concentration of $H_2S$ necessary for smooth operation of the Claus reactor. This point (B) is located on line I and represents the critical operating limits of the system, namely, the minimum industrial gas flow rate which gives rise to the minimum $H_2S$ concentration of the acid foul gas stream necessary to maintain operation of the entire system. Point (B) indicates the critical feed gas flow rate for the process. A line can be drawn between points (A) and (B) to roughly depict the relationship between the industrial gas flow rate and the foul gas constituency under the operating conditions for this hypothetical system. If the line is extended through point (B), the line represents a relationship between the industrial gas flow rate and the foul gas constituency resulting in an inoperative sulfur recovery system. Therefore, when the operation of the system reaches point (B), or is expected to fall into the inoperative area, the invention provides that the gas stream and the absorbent solution contact each other in a smaller absorption volume.

A smaller absorption volume is selected which will most efficiently and economically treat the critical gas flow, which in this case is 65% of maximum gas flow. Since the total absorption volume, or 100% of the absorption capacity, was designed to handle the maximum gas flow, or 100% of the gas flow, most efficiently, a smaller absorption volume sized to be that percentage of the total absorption volume which is equal to the percentage of the maximum gas at which the system becomes inoperative will most efficiently do the job at the critical gas flow rate. In other words the smaller absorption volume is that percentage of the total absorption volume numerically equal to the critical percent gas flow. FIG. 8 tells us this absorption volume is 65% of the original total absorption volume. The industrial gas stream flowing at 65% of maximum flow rate and being contacted by absorbent solution in an absorption volume which is 65% of the original total absorption volume will yield a foul gas stream having an $H_2S:CO_2$ concentration of 1:1. Point (C) is now positioned on the graph.

This smaller absorption volume will be able to handle a further decreasing feed gas flow rate below the critical gas flow rate for the original total absorption volume, the first critical gas flow rate, until its own critical operating capacity is reached. The reduced gas flow at which this new critical operating point is reached, or second critical gas flow rate, is the same percentage of the first critical gas flow as the first critical gas flow rate is of the maximum gas flow rate. For the system depicted by the graph in FIG. 8, the second critical gas flow rate will be 65%×65%=42.25% of the maximum gas flow rate and point (D) on line I has been located.

As before, another still smaller absorption volume is now used for contacting the absorbent solution with the decreased industrial gas flow to afford a foul gas composition that keeps the Claus plant operative as the feed gas flow decreases below the second critical gas flow rate. This second smaller absorption volume is 65% the size of the first smaller absorption volume, or 42.25% of the total absorption volume. Also as before, this second smaller absorption column is effective until the feed gas flow decreases to 27.46% (65%×42.55%) of the maximum industrial gas flow rate. In effect, the $H_2S$ removal and sulfur recovery system has been turned down to handle a gas flow almost one-quarter of the maximum gas flow for which the original total absorption volume was designed and much less than the flow rate at which the system became inoperative when only the total absorption volume was available. The invention is effective in maintaining at least the minimum concentration of $H_2S$ in the acid gas to keep the Claus plant operative as the industrial feed gas flow decreases by effecting absorption in a smaller absorption volume.

The graph in FIG. 8 illustrates an $H_2S$ absorption/desorption system in tandem with a Claus type sulfur recovery plant having particular operating parameters such that the $H_2S:CO_2$ concentration in the foul gas is 1:1 and the Claus plant becomes inoperative at 65% of maximum feed gas flow. Other systems designed to treat gas streams containing anticipated concentration ranges of $H_2S$ and $CO_2$ will have other operating parameters. However, the method disclosed above is applicable to all such systems when a decreasing flow rate jeopardize its smooth operation and a similar graph can be constructed to determine the size of the smaller absorption volumes needed for turndown ability.

In the above manner, the minimum size of the smaller absorption volume is determined for systems having a total absorption volume which is designed to emit a desulfurized gas stream that contains sulfur value concentrations within allowable environmental standards. For example, as seen in FIG. 8 the 65% absorption volume is employed when the gas flow decreases to 65% of maximum. If the smaller absorption volume is not used and the gas flow decreases further, the Claus plant no longer operates. If the smaller absorption volume is used before the gas flow falls to 65% of the maximum gas flow, or if the smaller absorption volume is less than 65% of the original absorption volume and the switch is made when the gas flow is at least 65% of the maximum, then the smaller absorption volume will not be able to remove sufficient $H_2S$ from the gas stream to have the desulfurized gas stream meet environmental standards. Thus, the minimum size of the smaller absorption volume required for absorption of the critical gas flow rate is established to keep the Claus plant operating and to emit a desulfurized gas having less than a maximum allowable $H_2S$ content.

It is consequently important not only to avoid operating the absorber with too little gas flow for the absorber volume but also to avoid operting the absorber with an absorber volume which is too small for the gas flow. In the first case the relative percentage of $H_2S$ to other components, i.e. $CO_2$, will drop too low to maintain effective operation of the following Claus reactor because the gas-liquid contact time is too long. In the second case the relative percentage of absorbed gases will be adequate for operation of the Claus unit but the gas-liquid contact time will be too brief to allow sufficient $H_2S$ to be removed from the gas stream to meet environmental standards.

Of course, to meet these two operating constants an absorption volume less than the original absorption volume but more than the minimum necessary for the critical gas flow can be used. This absorption volume should generally be no larger than 10 percentage points greater than the minimum absorption volume as a percentage of the original total absorption volume and preferably only 5 percentage points larger. In this manner the absorption system is operated close to the efficiency for which the system was originally designed. It is also possible to switch to a smaller absorption volume before the gas flow reaches the critical flow rate so long as the smaller absorption volume is sufficient in size to adequately handle the gas flow so that the desulfurized gas is within environmental limits. In other words the switch can be made when the flow rate as a percentage of the maximum flow rate numerically is no greater than the chosen smaller absorption volume as a percentage of the original total absorption volume. Referring to FIG. 8 again, when the gas flow decreases to 65–75% of the maximum flow, for example, a switch to a smaller absorption volume which is 75% of the original volume would be feasible. The operating line for the 75% absorption volume is shown by broken line G-H. By this method, the changeover can be achieved without any $H_2S$ pollution problems that could arise by attempting to switch to a 65% absorption volume exactly when the gas flow falls to 65% of maximum, for such a precise operation, most likely, would not be feasible. Such operation also obviates the danger of the Claus plant accidentally becoming inoperative because the critical flow rate was passed before the decreasing COG flow could be contacted by absorbent in a smaller absorption volume. In effect a buffer zone or leeway is provided.

To obtain sufficient overlap between the effective absorption capacity of the total absorption volume and the smaller absorption volume in order to maintain an acceptable $H_2S$ content in the desulfurized gas and an acceptable $H_2S:CO_2$ concentration in the foul gas without having to perform the change to the other absorption volume with precision when the COG reaches a particular flow rate, the following relationship between the flow rate of the gas and the smaller absorption volume should exit. When the COG flow rate decreases to within a 10 percentage point range of the critical percent COG flow rate and preferably within a 5 percentage point range, the switch to the smaller absorption volume is performed. As previously stated, it is most preferred that at the very latest, the smaller absorption volume must be utilized when the flow rate drops to the critical COG flow rate. The size of this smaller absorption volume is that percentage of the original total absorption volume which is within a range that is 10 percentage points above the percentage of the maximum COG flow rate at which the switch to the smaller absorption volume is made and preferably at least within a 5 percentage point range. At the very least the smaller absorption volume as a percentage of the total absorption volume must be numerically equal to the percentage of the maximum COG flow rate at which the switch is effected.

When the sulfur content of the desulfurized gas stream is not the subject of legislated environmental standards or need not be less than a maximum amount, or the total absorption volume and absorbent solution of the absorption/desorption system are so effective that there is a great leeway between the environmental limits and the actual sulfur content of the desulfurized gas, the smaller absorption volume need not be a minimum size to fully treat the gas flow. In that case the dimension of the smaller absorption volume and the gas flow rate at which the smaller absorption volume is to be used can be determined in the following manner. Again, the gas flow rate at which the changeover is performed is that flow rate which is within a 10 percentage point range of the percentage of the maximum gas flow rate at which the Claus plant becomes inoperative, the critical percentage gas flow rate, and preferably within a 5 percentage point range. It is most preferred that at the very latest, the switch to the smaller absorption volume should be accomplished when the gas flow rate reaches the critical gas flow rate. The smaller absorption volume should be that percentage of the original total absorption volume which is within a range that is 10 percentage points above and below the percentage of the maximum gas flow rate at which the change to the smaller absorption volume is made and preferably within a 5 percentage point range. Even though relationships between the COG flow and the smaller absorption volume may be established that emit larger $H_2S$ concentrations in the desulfurized gas than the original total absorption volume does, the gas stream will sustain the Claus plant. Additionally, by operating in these ranges the absorption system will be close to the efficiency of the original absorption system. Most preferably the smaller absorption volume as a percentage of the total absorption volume should be numerically equal to the percentage of the maximum gas flow rate at which the switch to the smaller absorption volume is made for optimum efficiency.

The method discussed above and graphically portrayed in FIG. 8 is particularly applicable to treatment of coke oven gas with an alkanolamine, or more particularly monoethanolamine, solution. For COG having a high $H_2S$ and low $CO_2$ content (for example, 1.0% to 1.5% $H_2S$ and 1.0% to 1.7% $CO_2$), a smaller absorption volume that is 50–65% of the total absorption volume would adequately assure sufficient turndown capability to maintain the Claus plant operative, while a smaller absorption volume that is 65–75% of the total absorption volume would be required for a low $H_2S$, high $CO_2$ COG (for example, 0.4% to 0.6% $H_2S$ and 2.0% to 2.8% $CO_2$). The switch to the smaller absorption volume is accomplished when the gas flow rate as a percentage of the maximum gas flow rate is numerically not greater than the size of the smaller absorption volume as a percentage of the total absorption volume.

In addition to $H_2S$ and $CO_2$ coke oven gas contains HCN among its other constituents. The HCN is also absorbed by the alkanolamine solution and is liberated in the desorption step as part of the foul gas stream. The additional heat afforded by combustion of the HCN in the Claus reactor reduces the volume percent of $H_2S$ in the foul gas at which the Claus reaction is affected. However, the HCN corrodes the reactor and is usually removed from the foul gas stream prior to its introduction into the reactor by absorption into water or destruction by hydrolysis with steam as is known in the art.

The smaller absorption volume can in some cases be in an absorption column that is separate and distinct from the column containing the total absorption volume or can be separate but compose, in combination with another absorption column, the total absorption volume. These two embodiments of the invention can be elucidated with reference to FIG. 9 which shows two absorption columns 40 and 42 which contain absorption volumes E and F, respectively. In the first embodiment, absorption volume E, for example, is the total absorption volume that handles the maximum gas flow. Absorption volume F can be the smaller absorption volume, being that percentage of absorption volume E which is within a 10 percentage point range of the percentage of the maximum gas flow at which the Claus plant becomes inoperative. Gas inlet line 44 splits into gas inlet lines 44E and 44F which enter the bottom of columns 40 and 42 respectively. Gas inlet line 44 contains valve means 46 which operates to direct the gas flow to either column alternately. Gas exit lines 48E and 48F leave the tops of columns 40 and 42, respectively, and merge into gas exit line 48 containing valve means 50 which operates to permit communication between line 48 and either line 48E or 48F alternately. Each column has an absorbent solution inlet line 52 and a rich absorbent solution exit line 54.

The $H_2S$ and $CO_2$ containing industrial gas stream flowing at or near the maximum flow rate passes through line 44 and valve means 46 which is adjusted to permit continued flow into line 44E and close off line 44F. The gas stream enters column 40 via line 44E and ascends through absorption volume E which is dimensioned to handle the maximum gas flow. The gas stream exits the column via lines 48E and 48 with valve means 50 being set to permit communication between lines 48E and 48 while closing off line 48F. The absorbent solution passes through line 52E into column 40 to descend through absorption volume E contacting the gas stream and exiting as rich absorbent solution via line 54E.

For example, when the gas stream flow rate as a percentage of the maximum flow rate decreases to be at most numerically equal to the size of absorption volume F as a percentage of the total absorption volume E and at least the critical percent flow rate, the gas stream is directed into column 42 through line 44F by adjusting valve means 46 to close off line 44E and allow for communication between lines 44 and 44F. The absorbent solution is now passed through line 52F into column 42 to countercurrently contact the upwardly flowing gas stream in absorption volume F before exiting via line 54F. The treated gas stream leaves column 42 by lines 48F and 48 by adjusting valve means 50 to close off 48E and open line 48F into line 48.

In the other embodiment, which also can be described using FIG. 9, the elements are the same except for valve means 46 and 50 and the relative size of absorption volumes E and F. In this embodiment valve means 46 is capable of proportioning the gas stream flow between lines 44E and 44F as well as closing off either line. Valve means 50 allows for communication between line 48 and both lines 48E and 48F simultaneously, or either line 48E or line 48F alternately. Both absorption volumes E and F together compose the total absorption volume needed to treat the maximum gas flow. Their relative sizes are such that the first of the two absorption volumes can be sized to be the smaller absorption volume which, for example, may be that percentage of the total absorption volume which is 10 percentage points greater than that percentage of the maximum gas flow at which the Claus plant becomes inoperative. In this case, absorption volume E will be arbitrarily selected as that first absorption volume. The size of the second of the two absorption volumes, in this case absorption volume F, will be the difference between the total absorption volume and the first absorption volume.

The industrial gas stream containing $H_2S$ and $CO_2$ and flowing at or near the maximum flow rate in line 44 passes into valve means 46 which splits the gas stream into lines 44E and 44F in a ratio equal to the ratio of absorption volume E to absorption volume F. The split gas stream then enters columns 40 and 42 ascending through absorption volumes E and F and exiting via lines 48E and 48F through valve means 50 which is set for lines 48E and 48F to communicate with line 48. The absorbent solution is passed into columns 40 and 42 via lines 52E and 52F respectively at the same flow rate per unit volume. After countercurrently contacting the split gas stream, the rich absorbent solution exits the absorption columns via lines 54E and 54F to be regenerated.

As the gas stream flow decreases, the gas flowing through each column will decrease proportionately. When the gas flow rate as a percentage of the maximum flow rate decreases, for example, to be at most numerically equal to the size of the absorption volume E as a percentage of the total absorption volume comprising absorption volumes E and F and at least the critical percentage flow rate, valve means 46 is regulated to close off absorption column 42 and direct the entire reduced gas flow into column 40 via line 44E. Simultaneously, the absorbent solution flow to column 42 is ceased. Thereafter, absorption of $H_2S$ and $CO_2$ into the absorbent solution only occurs in absorption volume E. The treated, desulfurized gas stream leaves column 40 via line 48E and line 48 as valve means 50 is adjusted to close off line 48F and column 42. In this embodiment the remaining unused portion of the original total volume, that is absorption volume F alone, could be used for more turndown. It is possible to connect more than two absorption volumes together in parallel as shown by FIG. 9 for further turndown capacity and flexibility.

The two embodiments depicted by FIG. 9 for practicing the invention of maintaining the relative concentrations of $H_2S$ and $CO_2$ in the foul gas so that the Claus plant remains operative as the feed gas stream flow decreases utilize two separate absorption columns that have been connected in parallel. Such construction of an absorption system requires the extensive use of expensive gas piping and gas valves since the gas stream is split. The preferred embodiments that have individual absorption volumes in series and split the absorbent stream are shown in FIGS. 1 and 2, with the embodiment of FIG. 1 being most preferred. The absorption columns of FIGS. 1 and 2 and their operation have been described previously and will not be repeated. With individual absorption volumes A and B forming the total absorption volume, the smaller absorption volume which, for example, can be that percentage of the total absorption volume which is 5 percentage points greater than the percentage of maximum gas flow at which the change to the smaller absorption volume is accomplished will be absorption volume B in FIG. 1 and absorption volume A in FIG. 2. The changeover to the smaller absorption volume can be made when the gas flow rate as a percentage of the maximum flow rate decreases to be within 5 percentage points of the critical percentage gas flow rate as an example.

At all times for the changeover to be successful when environmental emission limits are critical, the gas flow rate as a percentage of the maximum gas flow at which the switch is made must be numerically equal to or less than the size of the smaller absorption volume as a percentage of the total absorption volume. This ensures always having an absorption volume that can treat the $H_2S$ and $CO_2$ containing gas stream to yield a desulfurized gas stream that will contain sulfur values within environmental emission limits.

Figure 10:
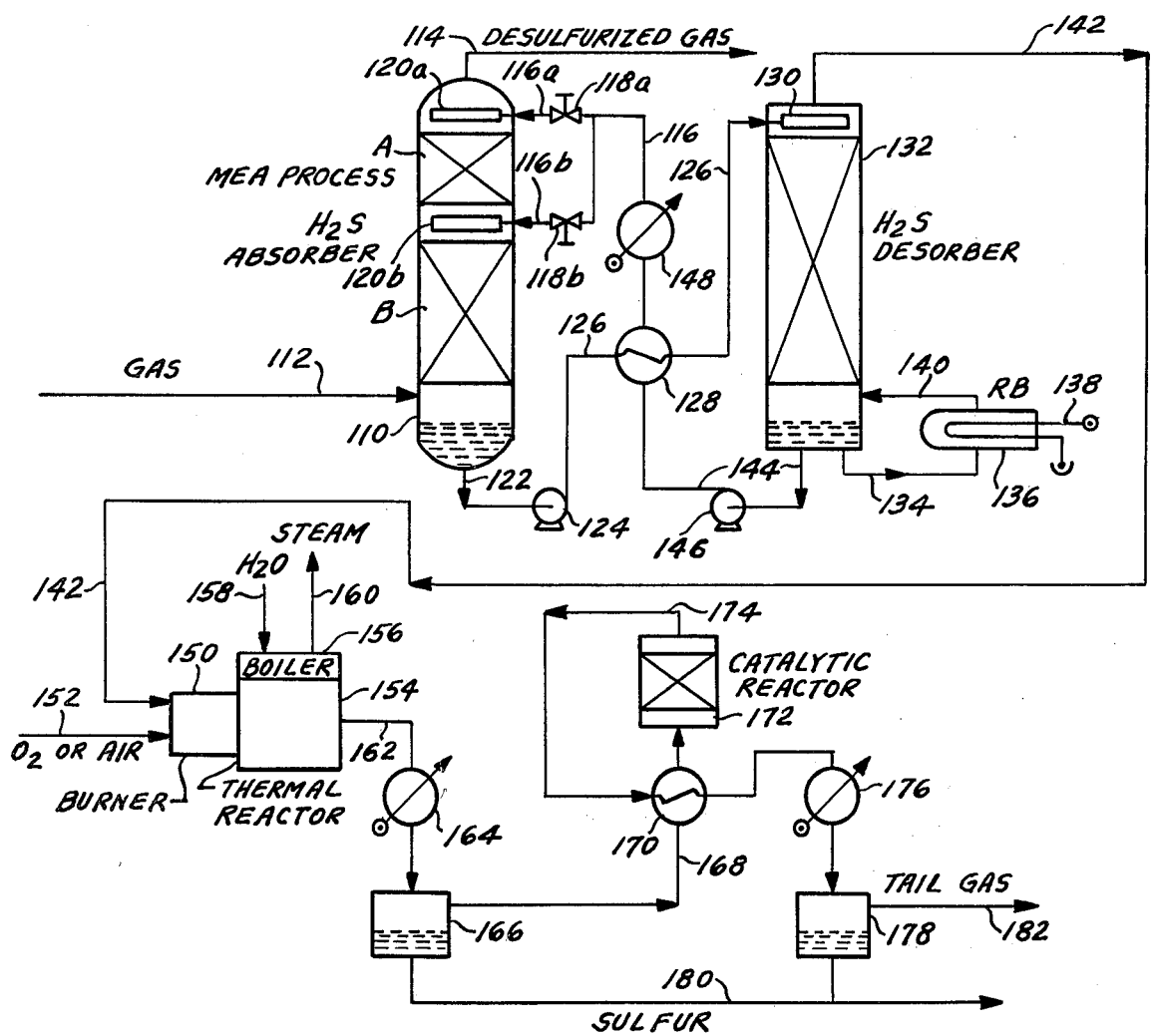
FIG. 10 shows the preferred embodiment of the invention incorporated into a typical $H_2S$ removal and sulfur recovery system.

FIG. 10 shows a preferred embodiment and process for the practice of this invention in a system for removing $H_2S$ from an industrial gas stream that also contains $CO_2$, such as COG, by absorption into an alkanolamine solution such as a monoethanolamine (MEA) solution and the recovery of the sulfur values as elemental sulfur. The $H_2S$ absorption column and the $H_2S$ desorber constitute the absorption/desorption, or desulfurization portion of the desulfurization-sulfur recovery system. The sulfur recovery portion is the well-known Claus type reactor. Other systems for recovering sulfur from $H_2S$ that are known in the art could also be used.

In FIG. 10 an $H_2S$ and $CO_2$ containing gas stream passes through feed line 112 into the bottom of absorption column 110. The gas after entering the column will ascend within the column through individual absorption volumes A and B which are connected in series to the top where the remaining unabsorbed gases will pass from the absorption column through line 114 as desulfurized gas. Where the industrial gas stream is COG, the desulfurized gas may be utilized as a gaseous fuel in a combustion process.

When the total absorption capacity of the absorption column is used, the monoethanolamine (MEA) absorbent solution enters the top of the absorption column via line 116, opened valve 118a and line 116a. Valve 118b is closed. From line 116a the MEA solution is fed into liquid distributor 120a and is spread throughout the top of absorption volume A. The MEA solution descends through absorption volume A and then through absorption volume B to collect in the bottom of the column as rich, or loaded, absorbent solution after having absorbed $H_2S$ and $CO_2$ during its intimate contact with the industrial gas in absorption volumes A and B.

The rich absorbent solution is withdrawn by line 122 and is pumped via pump 124 and line 126 through heat exchanger 128 to liquid distributor 130 in desorber 132. In the desorber the rich MEA absorbent solution is trickled downwardly through rising steam vapor. The MEA solution collects in the bottom of the desorption column and is passed through line 134 to reboiler 136 where the MEA solution is heated by steam coils 138. After being heated in the reboiler the MEA solution is discharged again via line 140 into the bottom of the desorber where it flashes partly into a hot vapor which then passes up through the descending MEA absorbent solution. $H_2S$, $CO_2$ and other acid gases absorbed or held in the absorbent solution in loose chemical association are freed from the absorbent solution. The gases stripped from the solution finally pass from the top of the desorption column via foul gas line 142.

Line 144 leads from the bottom of the desorber 132 via pump 146 to heat exchanger 128 where some of the heat of the hot solution is transferred to the cooler solution passing through line 126 from absorption column 110 to the desorption column 132. The cooled, regenerated MEA solution then passes through a heat exchanger or cooling device 148 before passing through line 116, opened valve 118a and line 116a to the liquid distributor 120a in the top of absorption column 110 above absorption volume A.

If the $H_2S$ and $CO_2$ containing industrial gas stream is flowing at or near the maximum rate for which the total absorption capacity absorption column was designed, the rich absorbent solution absorbs a concentration of $H_2S$ which is within an acceptable range and upon desorption affords an $H_2S:CO_2$ concentration ratio in the foul gas stream from the desorption column that permits the subsequent Claus reactor to operate efficiently. A significant decrease in the flow rate of the gas stream will cause the rich absorbent solution to contain an unacceptable $H_2S$ concentration with respect to the $CO_2$ concentration due to an increased residence time within the total absorption volume. Accordingly, the stripping of this rich absorbent solution will yield a foul gas having such a small $H_2S:CO_2$ concentration ratio that the $CO_2$ content interferes with the combustion of the gases in the Claus process and the necessary temperature will not be attained. Therefore, the residence time must be decreased by having a smaller gas-liquid contact volume.

In FIG. 10 the smaller effective absorption volume is achieved by closing valve 118a and opening valve 118b so that the MEA absorbent solution flowing through line 116 is conducted via line 116b into liquid distributor 120b above absorption volume B. Absorption volume A is effectively by-passed with gas-liquid contact now occuring in absorption volume B. The size of absorption volume B can be selected as described previously. The resulting rich MEA solution will yield a foul gas stream from the desorber in which the $H_2S:CO_2$ concentration ratio is compatible with the smooth operation of the Claus plant.

The $H_2S$ and $CO_2$ containing foul gas from the desorber 132 passes through line 142 to a burner 150 where the $H_2S$ and other combustible gases in the foul gas are oxidized by oxygen or air which enters burner 150 through line 152. Associated with burner 150 is a thermal reactor 154 and a boiler 156 which makes use of the heat of combustion and also the heat of reaction of the $H_2S$ and $SO_2$ in the thermal reactor 154 to form steam from boiler water which enters boiler 156 through line 158. Steam from the boiler exits through line 160. The function of thermal reactor 154 in the system is essentially to allow sufficient residence time for the reaction gases to reach their thermodynamic equilibrium point and to thoroughly intermix.

The amount of oxygen admitted to burner 150 is that amount sufficient to oxidize one-third of the $H_2S$ in the foul gas so that the ratio of $H_2S:SO_2$ in the oxidized gas is 2:1, the stoichiometric ratio for the reversible reaction of $H_2S$ and $SO_2$ to produce elemental sulfur according to the chemical equation

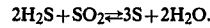

$$2H_2S + SO_2 \rightleftharpoons 3S + 2H_2O.$$

Some of the $SO_2$ immediately reacts with the $H_2S$ in thermal reactor 154 to form elemental sulfur. This sulfur is entrained as sulfur vapor in the hot gas which leaves the thermal reactor. The hot gases and entrained sulfur vapor are passed through line 162 to a heat exchanger or cooling coil 164 where the gases are cooled sufficiently to condense the sulfur vapor to molten sulfur which is then collected in sulfur collecting tank 166 as the cooled gases pass through the upper portions of the tank and out through line 168 to heat exchanger 170. In the heat exchanger the gases are reheated before being passed into a catalytic reactor 172 where the previously unreacted $H_2S$ and $SO_2$ are reacted together to form elemental sulfur and water. The gas passes from catalytic reactor 172 through line 174 to heat exchanger 170 where it gives up some of its heat of reaction to the gas entering the reactor. The partially cooled gas then passes through cooling coil or condenser 176 where the elemental sulfur vapor is condensed to molten sulfur which is collected in the bottom of sulfur collecting tank 178. The molten sulfur collected in the two sulfur recovery tanks 166 and 178 is removed, usually periodically, from these tanks through line 180 which leads to sulfur storage or use facilitates, not shown.

The tail gas from catalytic reactor 172 passes via the collector tank 178 through line 182 to equipment for further treatment as is common in the art such as additional catalytic reactors, incineration and emission into the atmosphere, oxidation and recycling of the $SO_2$ to the Claus reactor, or reduction and recycling of the $H_2S$ to the Claus reactor or absorption column.

The aqueous alkanolamine solutions absorb $H_2S$ much faster than $CO_2$ because $H_2S$ is a weak acid which will immediately react with the basic alkanolamine solution whereas $CO_2$ must first chemically equilibrate with the aqueous solvent to form the weak acid $H_2CO_3$ which then can react with the basic alkanolamine solution. Accordingly, this absorption rate difference between $H_2S$ and $CO_2$ should exist with any basic absorbent solution which could then be used in the practice of this invention.

Included in the inventive concept of bypassing or eliminating an individual absorption volume from the total absorption volume by redirecting the passage of one of the fluid streams is the situation in which the redirected fluid stream still passes through the eliminated individual absorption volume at such a reduced flow rate that minimal or insignificant gas-liquid contact occurs. That is to say that while some absorption may occur in the eliminated individual absorption volume, it is, in effect, eliminated or by-passed in relation to the degree of absorption which occurs in the remaining individual absorption volumes composing the total absorption volume.

In conjunction with the determining of the passage of a fluid stream through a total absorption volume comprising at least two individual absorption volumes connected in series to afford a lesser gas-liquid contact time for the gas stream by using a smaller absorption volume, a fine control over the ratio of absorbed gaseous components can be effected by a limited control of the absorbent flow rate in addition to particular sizing of the smaller absorption volumes.

We claim:

1. A method for maintaining operative a Claus-type sulfur recovery system which recovers sulfur removed as $H_2S$ from an $H_2S$ and $CO_2$ containing industrial gas stream having a variable flow rate, the percentage flow rate of the industrial gas stream decreasing below the rate at which the Claus-type sulfur recovery system becomes inoperative, this percentage flow rate being the critical percentage flow rate of the industrial gas stream, comprising:
   (a) passing an $H_2S$ and $CO_2$ containing industrial gas stream through an absorption apparatus having a total absorption capacity dimensioned to treat the maximum gas flow, which absorption apparatus includes at least two interconnected absorption sections,
   (b) contacting the industrial gas stream with a basic absorbent solution that absorbs $H_2S$ and $CO_2$ at different rates in the total absorption capacity of the absorption apparatus when the industrial gas flow rate is near the maximum to afford a desulfurized gas stream and to produce a loaded absorbent solution,
   (c) regenerating the loaded absorbent solution in a desorption apparatus to desorb the $H_2S$ and $CO_2$ to yield a foul gas stream,
   (d) reacting the foul gas stream in a Claus-type sulfur recovery system to form elemental sulfur,
   (e) eliminating the contact of the industrial gas stream with the basic absorbent solution in at least one absorption section when the flow rate of the industrial gas stream decreases to within 10 percentage points of the critical percentage flow rate,
   (f) allowing the contact of the industrial gas stream with the basic absorbent solution in the remaining absorption sections the absorption capacity of which as a percentage of the total absorption capacity of the absorption apparatus is within 10 percentage points of the critical percentage flow rate of the industrial gas stream to afford a desulfurized gas stream and to produce a loaded absorbent solution, and
   (g) repeating steps (c) and (d).

2. The method of claim 1 in which step (e) is performed when the flow rate of the industrial gas stream decreases to within 5 percentage points of the critical percentage flow rate of the industrial gas stream.

3. The method of claim 1 in which step (e) is performed when the flow rate of the industrial gas stream decreases to the critical percentage flow rate of the industrial gas stream.

4. The method of claims 2 or 3 in which the remaining absorption sections in which gas-solution contact is occurring have an absorption capacity which, as a percentage of the total absorption capacity, is within a 5 percentage point range of the critical percentage flow rate of the industrial gas stream.

5. The method of claim 3 in which the remaining absorption sections in which gas-solution contact is occurring have an absorption capacity which, as a percentage of the total absorption capacity, is equal to the critical percentage flow rate of the industrial gas stream.

6. The method of claim 1 in which the absorption apparatus comprises at least two absorption sections connected in parallel.

7. The method of claim 1 in which the $H_2S$ and $CO_2$ containing industrial gas stream is a coke oven gas stream.

8. The method of claim 1 in which the basic absorbent solution is an alkanolamine.

9. The method of claim 8 in which the alkanolamine is monoethanolamine.

10. A method for maintaining operative a Claus-type sulfur recovery system which recovers sulfur removed as $H_2S$ from a coke oven gas stream that is 1.0–1.5% $H_2S$ and 1.0–1.7% $CO_2$ and has a variable flow rate comprising:
    (a) passing the variably flowing coke oven gas stream through an absorption apparatus having a total absorption capacity dimensioned to treat the maximum gas flow, which absorption apparatus includes at least two interconnected absorption sections,
    (b) contacting the coke oven gas stream with a basic absorbent solution that absorbs $H_2S$ and $CO_2$ at different rates in the total absorption capacity of the absorption apparatus when the coke oven gas flow rate is near the maximum to afford a desulfurized gas stream and to produce a loaded absorbent solution,
    (c) regenerating the loaded absorbent solution in a desorption apparatus to desorb the $H_2S$ and $CO_2$ to yield a foul gas stream,
    (d) reacting the foul gas stream in a Claus-type sulfur recovery system to form elemental sulfur,
    (e) eliminating the contact of the coke oven gas stream with the basic absorbent solution in at least one absorption section and allowing contact in the remaining absorption sections the absorption capacity of which is 50–65% of the total absorption capacity of the absorption apparatus when the flow rate of the coke oven gas stream as a percentage of its maximum flow rate decreases to a value numerically not greater than the absorption capacity of the remaining absorption sections as a percentage of the total absorption capacity of the absorption apparatus, and
    (f) repeating steps (c) through (d).

11. The method of claim 10 in which the coke oven gas stream is 0.4–0.6% $H_2S$ and 2.0–2.8% $CO_2$ and the absorption capacity of the remaining absorption sections is 65–75% of the total absorption capacity.

12. The method of claim 10 or 11 in which the absorption apparatus comprises at least two absorption sections connected in parallel.